Dec. 15, 1959  A. A. LECONTE  2,917,603
PROTECTIVE DEVICES FOR ELECTRICAL MEASUREMENT INSTALLATIONS
Filed Jan. 27, 1958  2 Sheets-Sheet 1

United States Patent Office 2,917,603
Patented Dec. 15, 1959

2,917,603

PROTECTIVE DEVICES FOR ELECTRICAL MEASUREMENT INSTALLATIONS

Andre Albert Leconte, Le Vesinet, France, assignor to Chauvin d'Arnoux, Societe Anonyme, Paris, France, a corporation of France Application January 27, 1958, Serial No. 711,237

Claims priority, application France April 12, 1957

2 Claims. (Cl. 200—106)

The present invention relates to the protection of electrical measurement installations.

Electrical measuring installations, and mainly those designed to carry out multiple measurement operations, are frequently put out of order as a consequence of accidental overloads, resulting in particular from errors of operation.

In order to avoid these difficulties, a known method consists in providing the measuring instrument with a small circuit-breaker, the coil of which is connected to the terminals of this instrument through the medium of contacts closed by the needle which is rigidly fixed to the moving system, when the needle passes beyond the extremity of the scale. In addition to the difficulties of its construction, by reason of the very small mechanical couples employed, this method has the drawback that it introduces an additional delay corresponding to the movement of the needle from one end of the scale to the other, during which delay certain parts of the installation are subjected to a brief overload which may be sufficient to put them out of order. This is especially the case with copper oxide-copper rectifiers, for which an excessive reverse voltage, even of very small duration, is dangerous. A further disadvantage of the system referred to, in the case of multiple controllers comprising direct-current gauges and alternating-current gauges, is that the protection is ineffective when the apparatus is accidentally connected to an alternating voltage when it is on a position for direct-current measurement. In this case, in fact, the moving system is not deflected, and in consequence does not operate the contacts arranged at the end of its travel. Auxiliary devices of a more or less complicated nature must then be provided to remedy this drawback.

A risk of non-operation of the protection by circuit-breaker also resides in the manual method of re-closing the breaker. When the circuit-breaker has carried out its function and separated the measuring circuit from the overload voltage applied to the terminals, the operator must normally disconnect the dangerous voltage or change the gauge of the apparatus and then carry out the operation of re-closing the circuit-breaker. If this operation is carried out prematurely, it prevents the normal functioning of the circuit-breaker and thus results in putting the apparatus out of service.

In accordance with the present invention, there is used in the first place an electro-magnetic circuit-breaker, the advantage of which is mainly that it ensures an immediate opening as soon as the re-closing operation has been carried out, without any operation error being able to prevent this opening, so that the protection is ensured in a manner which is so to speak continuous if the re-closing operation is effected while there still remains an overload on the circuit in which the circuit-breaker is interposed.

To this end, the circuit-breaker in accordance with the present invention comprises a push-rod movable longitudinally for opening and re-closing the breaker, subjected to the action of an elastic device which tends to release the circuit-breaker, a release coil adapted to move to-and-fro parallel to the push-rod and having its armature co-operating with this push-rod so as to retain it when the armature is not attracted by the coil and to free it when the coil is excited, and an operating member which enables the to-and-fro movement to be communicated to the coil-armature assembly. For re-closing, the coil and the armature are brought by means of the operating member into the position of retention of the push-rod during a first period, and during a second period this armature and this push-rod are brought into the re-closing position, so that if at the very instant of re-closing there persists or there is produced an over-voltage on the circuit, the armature is instantaneously attracted and produces the release of the breaker without any possibility of this release being prevented by any operating error.

In order to employ the rapidity of operation of such a circuit-breaker to the maximum extent, it is an advantage for the supply of its coil to be effected directly from the overload voltage which appears at the terminals of the measuring installation, through the intermediary of a resistance suitably chosen in dependence on the voltage. This resistance then functions as an instantaneous electronic switch, both for direct-current and for an alternating-current, and the rapidity of operation of the circuit-breaker supplied in this way is such that, even in the case of very heavy overloads, the break generally takes place before the needle of the measuring galvanometer has reached one-third of its normal deflection.

As compared with the system in which the supply of the circuit-breaker coil is effected through the intermediary of contacts actuated by the galvanometer, the present system has, furthermore, on the one hand a greater safety of operation and, on the other hand, the advantage of retaining its effectiveness when the current causing the overload is in a form which does not cause deflection of the galvanometer (alternating-current for a measuring installation which is exclusively sensitive to direct-current). When the measuring installation to be protected comprises multiple gauges, in particular voltage gauges and current gauges, it may be necessary to employ various resistances as a function of the voltage for the various gauges to be protected. In these conditions, use can be made with advantage of the gauge-changing switch to control the insertion of the resistances in circuit, these resistances being a function of the voltage and respectively adapted to these gauges or ranges.

Finally, when a measuring installation is used, which is provided with a galvanometer mounted in the diagonal of a Wheatstone bridge provided with rectifiers which are very sensitive to reverse voltage overloads, such as copper-oxide rectifiers (which constitutes a standard connection) it is useful to complete the two protections referred to above by a non-linear resistance which varies inversely with the voltage and is connected in shunt across the terminals of the galvanometer, this resistance being intended to prevent any reverse over-voltage, even of very short duration.

The invention is described below and is diagrammatically illustrated by way of example in the accompanying drawings, in which.

Figure 1:
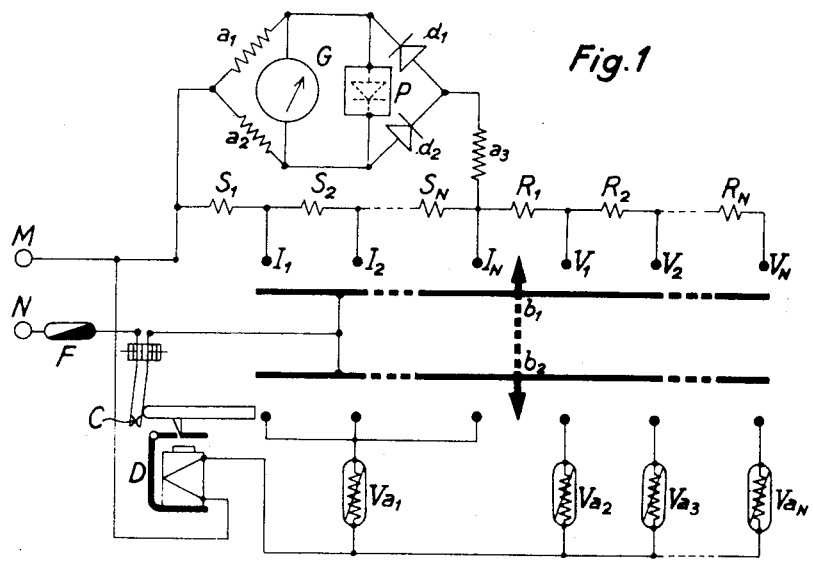
Fig. 1 shows the general arrangement of the electrical diagram of a complete installation comprising all the protective devices provided.

In Fig. 1, it can be seen that the current or the voltage to be measured passes to the apparatus by the two terminals M and N. The circuit comprises in succession the fuse F (optional), the contact C, the opening of which is controlled by the application of voltage to the circuit-breaker D, the slider $b_1$ intended for the selection of the range of the measuring circuit side. There then follow either the resistances $R_1$, $R_2$ ... $R_N$ in the case of a voltage measurement, or the resistances $S_1$, $S_2$ ... $S_N$ in the case of a current measurement, then the resistance $a_3$ and the rectifier bridge with two resistances $a_1$, $a_2$ and two rectifier elements or diodes $d_1$ and $d_2$, and finally the galvanometer G with a moving frame, mounted in shunt, and a non-linear resistance P which varies inversely with the voltage.

In order to complete the protection circuit, the slider $b_2$ which is mechanically fixed to the slider $b_1$ connects in series with the coil of the circuit-breaker D one of the resistances $Va_1$, $Va_2$ ... $Va_N$, which are a function of the voltage and the ohmic resistance of which varies inversely with the voltage.

The non-linear resistance P, which can be preferably formed by one or two series elements of selenium rectifiers or by a silicon diode, should be chosen in such manner that the current shunted in the conditions or normal operation is negligible as compared with that passing through the galvanometer, so that its possible variations with the ambient temperature do not reduce the accuracy of measurement. During an overload, the resistance P acts instantaneously to limit to a few volts the voltage effectively applied to the galvanometer G.

The non-linear characteristics of the diodes $d_1$ and $d_2$ act together with those of the resistance P so as to prevent these elements from being subjected to dangerous reverse voltages.

The resistances $Va_2$ ... $Va_N$ which are a function of the voltage, are selected so that, at the voltage corresponding to the range protected, they do not substantially modify the internal resistance of the instrument. The resistance $Va_1$ which is a function of the voltage and is intended to protect the whole of the current ranges, should only give rise to a negligible shunt current, especially in respect of the lowest gauge or range $I_N$.

During an overload, the over-voltage which is applied to these resistances $Va_1$ ... $Va_N$ causes a reduction in their ohmic resistances and thus enables the coil of the circuit-breaker to be put instantaneously under tension.

Figure 2:
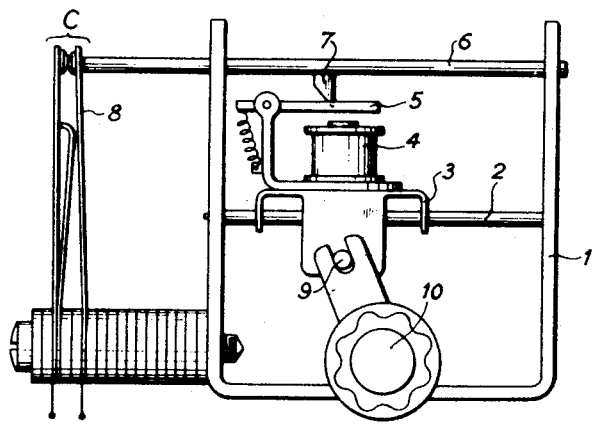
Figs. 2, 3 and 4 show the circuit-breaker diagrammatically in three different positions.

As far as the circuit-breaker is concerned (see Figs. 2 to 4) it can be seen that the supporting frame 1 comprises two cross members 2 forming a slide to guide the lateral movement of the trolley 3 carrying the coil 4 of the circuit-breaker. The circuit-breaker is shown in Fig. 2 in its normal set position. The push-rod 6 which can slide freely in the frame parallel to the trolley 3, holds the contacts C closed as long as the stud 7 is engaged in an adequate opening formed in the armature 5. When this armature is drawn away due to the attraction of the core of the coil 4, the stud 7 is freed and the rod 6 is moved by the pressure applied to it from the spring blade 8 which carries one of the contacts C (see Fig. 3).

The re-setting knob 10 enables a to-and-fro motion to be given to the trolley 3 by means of the finger 9 which is rigidly fixed to this trolley.

Figure 3:
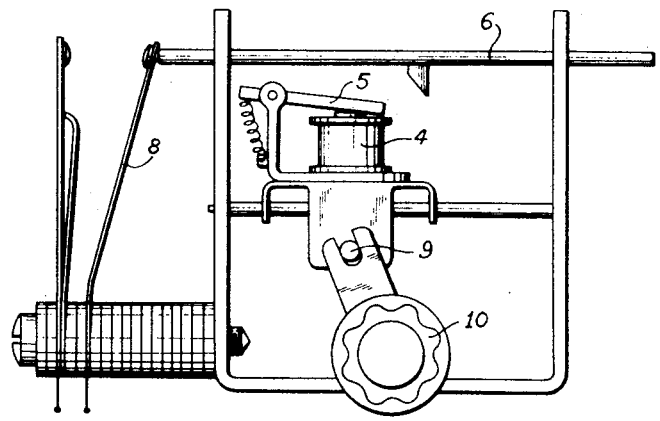

The operation is as follows:

After opening, the parts have come into the positions indicated in Fig. 3. For re-closing, the control knob 10 is first turned clockwise. At the end of this movement (see Fig. 4), the stud 7 can again come into engagement in the opening 5, since the coil is de-energized. The control knob is then counterclockwise in the opposite direction, and the push-rod 6 pushes back the spring blade 8 so as to reclose the contact C. If at the very instant when the contacts C touch each other, there exists a voltage which causes an overload, the circuit-breaker opens immediately and performs its function of protection, while this opening cannot be prevented by any error of operation.

Figure 4:
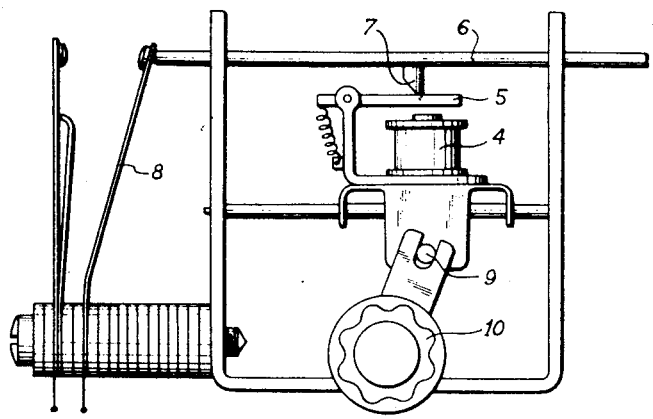

The form of embodiment shown in Figs. 2, 3 and 4 is not in any sense restrictive and a movement of rotation of the trolley 3 and the push-rod 6 could be substituted for the lateral movement, without departing from the scope of the present patent.

What I claim is:

1. An electro-magnetic circuit-breaker, more particularly intended for the protection of measuring circuits, and comprising in combination: a push-rod being movable longitudinally for opening and re-closing a circuit, a first contact in said circuit, a blade spring having a second contact cooperative with the first contact and tending to open the contacts; a release coil interposed in the circuit and provided with an armature, adapted to receive a to-and-fro movement parallel to that of the push-rod, said armature co-operating with the push-rod so as to retain said rod in a direction opposite to that of the action of the spring when the armature is in a rest position and to free it when the coil is energized; and an operating member co-operating with the said coil to impart a to-and-fro movement parallel to that of the push-rod and to bring the coil and the armature into the position of retention of the push-rod during a first period, and during a second period to bring the push-rod into the re-closing position.

2. An electro-magnetic circuit-breaker more particularly intended for the protection of measuring circuits, comprising in combination: a frame; a push-rod slidable longitudinally in the said frame; a switch having spring blades carrying contacts for opening and closing a circuit and fixed in the frame at the end of said push-rod, one of the spring blades being disposed bearing on an end of said rod so as to tend to force the said push-rod towards a direction for opening the contacts; a trolley displaceable on the frame parallel to the push-rod; a coil mounted on said trolley; an armature pivotally-mounted on said trolley and cooperating with said coil; means provided on said armature and on said push-rod for cooperatively engaging with each other; an elastic device urging said armature towards a rest position in which said armature and rod are operably engaged and the armature holds the rod urging the blade springs together closing the contacts, and a control knob mounted in the frame and co-operating with said trolley in order to apply to said trolley to-and-fro movement to position the trolley in position for allowing the armature to cooperatively engage the rod and displace it in a direction in which the rod closes the contacts, whereby when the coil is energized the armature is attracted and the rod is released allowing the contacts to open.

References Cited in the file of this patent
UNITED STATES PATENTS

| | | |
|---|---|---|
| 694,396 | Lye et al. | Mar. 4, 1902 |
| 1,657,320 | Roth | Jan. 24, 1928 |
| 1,740,911 | Todd | Dec. 24, 1929 |
| 2,079,577 | Parsons | May 4, 1937 |
| 2,517,638 | Decker | Aug. 8, 1950 |
| 2,584,800 | Grisdale | Feb. 5, 1952 |